United States Patent [19]

Stephens et al.

[11] Patent Number: 5,135,909
[45] Date of Patent: Aug. 4, 1992

[54] DRILLING MUD COMPRISING TETRAPOLYMER CONSISTING OF N-VINYL-2-PYRROLIDONE, ACRYLAMIDOPROPANESULFONIC ACID, ACRYLAMIDE, AND ACRYLIC ACID

[75] Inventors: Michael Stephens; Billy L. Swanson, both of Bartlesville, Okla.

[73] Assignee: Phillips Petroleum Company, Bartlesville, Okla.

[21] Appl. No.: 469,997

[22] Filed: Jan. 25, 1990

[51] Int. Cl.$^5$ .............................................. C09K 7/02
[52] U.S. Cl. .................................................. 507/121
[58] Field of Search ................. 252/8.51, 8.513, 8.514; 507/121

[56] References Cited

U.S. PATENT DOCUMENTS

| | | | |
|---|---|---|---|
| 4,048,077 | 9/1977 | Englehardt et al. | 252/8.5 C |
| 4,076,628 | 2/1978 | Clampitt | 252/8.5 C |
| 4,293,427 | 10/1981 | Lucas et al. | 252/8.5 |
| 4,358,355 | 11/1982 | Kalu et al. | 204/159.16 |
| 4,432,881 | 2/1984 | Evani | 252/8.5 A |
| 4,455,240 | 6/1984 | Costello | 252/8.5 |
| 4,471,097 | 9/1984 | Uhl et al. | 526/240 |
| 4,525,562 | 6/1985 | Patel | 526/271 |
| 4,547,299 | 10/1985 | Lucas | 252/8.5 |
| 4,599,390 | 7/1986 | Fan et al. | 526/240 |
| 4,622,373 | 11/1986 | Bardoliwalla | 526/240 |
| 4,626,362 | 12/1986 | Dickert, Jr. et al. | 252/8.51 |
| 4,631,137 | 12/1986 | Dymond | 252/8.514 |
| 4,652,623 | 3/1987 | Chen et al. | 526/287 |
| 4,655,942 | 4/1987 | Dickert, Jr. et al. | 252/8.5 |
| 4,675,119 | 6/1987 | Farrar et al. | 252/8.514 |
| 4,699,225 | 10/1987 | Bardoliwalla | 175/72 |
| 4,726,906 | 2/1988 | Chen et al. | 252/8.514 |
| 4,741,843 | 5/1988 | Garvey et al. | 252/8.5 |
| 5,080,809 | 1/1992 | Stahl et al. | 252/8.554 |

OTHER PUBLICATIONS

"Aldrich" cover page & p. 393.
"Composition and Properties of Drilling and Completion Fluids", Fifth Edition, H. C. H. Darley & George R. Gray, pp. 166–175.

Primary Examiner—John S. Maples
Assistant Examiner—Gary L. Geist
Attorney, Agent, or Firm—Gary L. Haag

[57] ABSTRACT

A water-based drilling fluid comprising a water soluble tetrapolymer in combination with clayey materials.

4 Claims, No Drawings

DRILLING MUD COMPRISING TETRAPOLYMER CONSISTING OF N-VINYL-2-PYRROLIDONE, ACRYLAMIDOPROPANESULFONIC ACID, ACRYLAMIDE, AND ACRYLIC ACID

FIELD OF THE INVENTION

This invention relates to water-based drilling fluids. In another aspect, this invention relates to controlling the rheological properties of water-based drilling fluids. In another aspect, this invention relates to a method of drilling a well utilizing water-based drilling fluids exhibiting improved water loss control. In accordance with a further aspect, this invention relates to an additive package comprising tetrapolymers to significantly reduce water loss in drilling fluids.

BACKGROUND OF THE INVENTION

In the drilling of wells by the rotary method, a drilling fluid is used which generally consists of an aqueous clay suspension often containing weighting agents to increase the hydrostatic head and frequently also containing concentrated colloidal suspending and conditioning agents.

The drilling fluid serves to bring cuttings to the surface, to cool the bit and to keep the oil, gas and water confined to their respective formations during the drilling process. For these functions, it is necessary that the drilling fluid be of pumpable viscosity, have sufficient carrying capacity to bring cuttings to the surface, and yet be fluid enough to release cuttings and entrained gas at the surface.

A highly important property of drilling muds is the ability to form an impervious filter cake upon the permeable walls of the bore hole, thus inhibiting further ingress of water from the drilling fluid into the formation. Excessive fluid loss from drilling fluids can cause severe problems. For example, filter cake build-up can become so thick that the drill pipe may become stuck. Also, there may be great difficulty in withdrawing pipe from the hole. Also, high water losses can cause sloughing and caving in of shale formations. In addition, electrical logging of the well can be adversely influenced due to the mud filtrates, etc.

Various water loss control agents have been previously proposed to improve the properties of drilling fluids, but not all of these have been successful.

Applicants have discovered tetrapolymers which have attractive properties as fluid loss control agents.

Accordingly, an object of this invention is to provide an improved drilling fluid.

Another object of this invention is to provide an improved method of drilling a well.

Another object of the invention is to control the rheological properties of drilling fluids.

Other objects, aspects, as well as the several advantages of the invention will be apparent to those skilled in the art upon reading the following disclosure and appended claims.

SUMMARY OF THE INVENTION

In accordance with the present invention we have discovered a water-based drilling fluid comprising
a) a clayey mineral in an amount effective in a water-based drilling fluid; and
b) a tetrapolymer provided in an amount effective to provide fluid loss control.

In accordance with a further embodiment of the present invention we have also discovered a method for drilling a well utilizing a rotary drill comprising circulating through said well a water-based drilling fluid containing an effective amount of a clayey material for a water-based drilling fluid and an effective amount of tetrapolymer to control water-loss wherein said water-based drilling fluid will form a filter cake on the wall of said well.

DETAILED DESCRIPTION

As used in this application the term tetrapolymer refers to the polymerization product of at least a four monomer component polymerization. The four monomer components suitable for the practice of the present invention are:

Monomer component A which has the formula

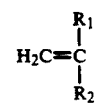

wherein $R_1$ is selected from the group consisting of hydrogen and methyl radical, and $R_2$ is selected from the group consisting of sulfo, sulfophenyl, sulfoalkyl, sulfoalkyl amido, and alkali salts thereof; wherein the $R_2$ alkylene and alkyl radicals contain from 1 to 4 carbon atoms and the alkali salt is a salt of a cation selected from the group consisting of sodium, potassium, and ammonium;

Monomer component B which has the formula

wherein $R_3$ is selected from the group consisting of hydrogen, methyl, and ethyl radicals, and $R_4$ is selected from the group consisting of N-alkyl substituted amide, N,N-dialkyl substituted amide, carboxyl alkylene amine, carboxyl alkylene methyl amine, carboxyl alkylene dimethyl amine, pyrrolidonyl, formamido and acetamido radicals, wherein the alkyl radical of said N-alkyl substituted amide is selected from the group consisting of methyl, ethyl, and propyl radicals; wherein the $R_4$ alkylene radical contains 1 to 3 carbon atoms; wherein the alkyl radical of said N,N-dialkyl substituted amide is selected from the group consisting of methyl or ethyl radicals.

Monomer component C which has the formula

wherein $R_5$ is selected from the group consisting of hydrogen and methyl, and $R_6$ is selected from the group consisting of amide, nitrile, acetyl and pyridinyl radicals;

Monomer component D, which has the formula

wherein $R_7$ is selected from the group consisting of hydrogen, hydroxyl and methyl radicals; $R_8$ is selected from the group consisting of hydrogen, hydroxyl, methyl and carboxyl radicals; $R_9$ is selected from the group consisting of chlorine, bromine, hydrogen, methyl and carboxyl radicals or where $R_8$ can be linked to $R_{10}$ by an anhydride group; or $R_{10}$ is selected from the group consisting of carboxyl, and alkyl carboxyl radicals; wherein the alkyl radical of said alkyl carboxyl radical contains 1 to 8 carbon atoms and alkali salts thereof; wherein said alkali salt is a salt of a cation selected from the group consisting of sodium, potassium, and ammonium.

Suitable examples of monomer component A include but are not limited to compounds selected from the group consisting of 2-acrylamido-2-methylpropanesulfonic acid, alkali salts of 2-acrylamido-2-methylpropane sulfonic acid, vinyl sulfonic acid, alkali salts of vinyl sulfonic acid, vinyl benzene sulfonic acid, alkali salts of vinyl benzene sulfonic acid, allyl sulfonic acid, alkali salts of allyl sulfonic acid, methallyl sulfonic acid, alkali salts of methallyl sulfonic acid, 3-methacrylamido-2-hydroxypropyl sulfonic acid, alkali salts of 3-methacrylamido-2-hydroxypropyl sulfonic acid and combinations of two or more thereof; wherein said alkali salts are salts of a cation selected from the group consisting of sodium, potassium, and ammonium.

Suitable examples of monomer component B include but are not limited to compounds selected from the group consisting of N,N-dimethylacrylamide, N-vinyl-2-pyrrolidone, N-vinylacetamide, dimethylamino ethyl methacrylate, N-methyl (meth) acrylamide, N-ethyl (meth) acrylamide, N-propyl (meth) acrylamide, N-vinyl formamide, and combinations of two or more thereof.

Suitable examples of monomer component C include but are not limited to monomers selected from the group consisting of acrylamide, methacrylamide, acrylonitrile, methacrylonitrile, vinylacetate, vinylpyridine and combinations of any two or more thereof.

Suitable examples of monomer component D include but are not limited to compounds selected from the group consisting of acrylic acid, alkali salts of acrylic acid, methacrylic acid, alkali salts of methacrylic acid, itaconic acid, alkali salts of itaconic acid, aconitic acid, alkali salts of aconitic acid, undecylenic acid, alkali salts of undecylenic acid, angelic acid, alkali salts of angelic acid, maleic anhydride, maleic acid, alkali salts of maleic acid, chloroacrylic acid, alkali salts of chloroacrylic acid, citraconic acid, alkali salts of citraconic acid and combinations of any two or more thereof, where said alkali salt is a salt of a cation selected from the group consisting of sodium, potassium and ammonium.

As used in this application, the term tetrapolymer broadly refers to a water soluble polymer which is composed of a) from about 1 to about 60 weight percent of monomer component B, b) from about 1 to about 60 weight percent of monomer component C, c) from about 10 to about 90 weight percent of monomer component A, and d) from about 1 to about 60 weight percent of monomer component D.

One preferred tetrapolymer contains from about 30 to about 40 weight percent of N-vinyl-2-pyrrolidone, from about 5 to about 15 weight percent of acrylamide, from about 50 to about 60 weight percent of sodium 2-acrylamido-2-methylpropane sulfonate, and from about 1 to about 10 weight percent of acrylic acid.

Currently the preferred tetrapolymer composition comprises a) from about 10 to about 61 weight percent of monomer component A; b) from about 10 to about 60 weight percent of monomer component B; c) from about 3 to about 60 weight percent of monomer component C; and d) from at least 10 to about 55 weight percent of monomer component D.

The currently most preferred tetrapolymer composition comprises a) from about 15 to about 45 weight percent of monomer coponent A; b) from about 10 to about 30 weight percent of monomer component B; c) from about 20 to about 45 weight percent of monomer component C; and d) from about 10 to about 20 weight percent of monomer component D. This particular tetrapolymer composition is believed to provide the best water loss control of any water loss control polymer tested to date. Tetrapolymers of this composition show extremely good water loss control over a broad range of temperatures in fresh water and brine solutions. The preferred monomer components for making this tetrapolymer composition are a) 2-acrylamido-2-methylpropane sulfonic acid, or sodium 2-acrylamido-2-methylpropane sulfonate; b) N-vinyl-2-pyrrolidone; c) acrylamide; and d) sodium acrylate or acrylic acid.

The tetrapolymers of the present invention can be prepared by polymerization in accordance with any of the well known free radical techniques in solution, suspension or emulsion environment. See, for example, U.S. Pat. No. 3,547,899, or European patent application No. 0115836. In addition, other methods of polymerization known to one skilled in the art may be employed.

Preferred for the practice of the present invention is the polymerization of the four monomer components in a highly energetic polymerization process wherein a significant excess of initiation energy is provided by chemical or electromagnetic means including electrons, gamma rays, x-rays, slow neutrons and ultra violet radiation. The utilization of excess initation energy appears to result in the formation of consistently better tetrapolymers for use in water loss control. By way of guidance but in no way limiting to the present invention it has been found that a 100 percent excess of a chemical initator such as 2,2'azobis(N,N'-dimethylene isobutyramidine) dihydrochloride is effective to produce tetrapolymers with improved water loss control.

The molecular weight of the tetrapolymers of the present invention may be varied over a considerable range. The molecular weight may be as low as 30,000 or as high as 1,000,000 or more.

In water-based drilling mud composition, the combined amount of tetrapolymer present in the mud can vary appreciably but will be an amount which is sufficient to reduce water loss due to filtration through a filter cake in a well—in other words, a water loss reducing amount. Generally, the total tetrapolymer comprises in the range of about 0.25 to 8.0 lb/bbl based on barrels of mud composition, preferably in the range of about 0.5 to about 5.0 lbs. per barrel of mud wherein approximately 6 to about 15 lb/bbl of clayey mineral (such as clayey minerals selected from the group consisting of bentonite, attapulgite, sepiolite and hectorite) are provided in each 42 gallon barrel.

In actual operation, the tetrapolymer can be blended together with other additives for incorporation into a drilling fluid. In the event that other additives are used, the tetrapolymer can be added together with the additive or separately to a drilling fluid. It is also within the scope of the invention to add the tetrapolymer to a drilling fluid followed by addition of a mixture of other additives.

The tetrapolymer of the instant invention is suitable for use in fresh water, brackish water, and hard brine environments.

As used herein, the term "brine" is intended to include any aqueous solution of mineral salts having greater than 10,000 ppm dissolved solids content, such as are frequently present in oil fields. Oil field brines commonly contain varying amounts of sodium chloride, calcium chloride, or magnesium salts.

The drilling compositions of the invention preferably comprise an aqueous composition containing an effective amount of a clayey material, and optionally weighting, suspending and conditioning agents. Additives such as oxidation and corrosion inhibitors, bactericides, thinners, etc., can be added to the aqueous solution.

In utilizing the drilling fluid of the invention, a well is drilled by rotating a hollow drill stem having a drill bit attached thereto to form a bore hole and the drilling fluid is circulated down through the drill stem and out the bit and then upwardly to deposit a filter cake on the walls of the bore hole and carry cuttings to the surface.

The following examples will serve to further illustrate the invention.

EXAMPLE I

All polymers were prepared using a bulk solution polyerization, with a free radical initiator in a stoichiometric excess (approximately 100% excess). The initiator used was 2,2'-azobis-(N,N'-dimethyleneisobutyramidine) dihydrochloride. The monomer components were added in the desired weight percent ratio, with water being added to achieve the desired solids content. EDTA (tetrasodium ethylenediamine tetraacetate), a chelating agent, was also added in a stoichiometric excess. The system was thoroughly purged with an inert gas, and the monomers were allowed to react at temperatures in the range of 20° to 60° C. The following tetrapolymers were made utilizing this procedure.

TABLE 1

| Polymer Sample No. | Monomer Ratio, weight % | | | |
|---|---|---|---|---|
| | AM | NaAc | SAMPS | NVP |
| 227-52-1 | 10 | 16.65 | 54.9 | 18.45 |
| 227-53-1 | 9 | 9.5 | 61 | 20.5 |
| 227-69-4 | 3 | 15.5 | 61 | 20.5 |
| 237-26-1 | 3 | 15.5 | 61 | 20.5 |

AM = acrylamide
NaAc = sodium acrylate
SAMPS = sodium 2-acrylamido-2-methylpropane sulfonate
NVP = N-vinylpyrrolidone

EXAMPLE II

This example demonstrates the effectiveness of various polymers in the prevention of water loss in drilling mud. The specific mud used here was Baroid hard brine mud. Polymers were added as specified to Baroid hard brine mud, along with enough tap water to make a total volume of 350 mls. The resulting solution was stirred for 20 minutes on a Multi-Mixer, and then tested according to American Petroleum Institute (API) procedure RP-13 B. Test results are shown in Table II.

TABLE II

| Tetrapolymers Added to Baroid Hard Brine Mud | | | | | | |
|---|---|---|---|---|---|---|
| Polymer | ppb | Type | PV | YP | Gels | RTWL |
| Base Mud | — | — | | | | |
| 227-52-1 | 2.25 | 35% gel log | 7 | 0 | 4/— | 15.8 |
| 227-53-1 | 2.25 | 35% gel log | 8 | 0 | 2/— | 11.7 |

Baroid Hard Brine = 1235 g NaCl, 308 g CaCl$_2$, and 78.5 g MgCl$_2$ to Total Volume 5000 mls tap water.
Baroid Hard Brine Mud = 240 ml Baroid Hard Brine, 9.8 g attapulgite clay, stir 20 minutes.
ppb represents pounds per barrel
PV represents plastic viscosity in centipoise
YP represents yield point in lb/100 ft$^2$
Gels represents gel strength in lb/100 ft$^2$, 10 sec. and 10 min.
RTWL represents room temperature water loss at 100 psi in ml/30 minutes
HTHPWL represents water loss at 350° F., 500 psi in ml/30 minutes.

EXAMPLE III

This example demonstrates the effectiveness of various polymers in the control of water loss in drilling mud. The specific mud used here was saturated NaCl water mud. Polymers were added as specified to NaCl water mud, along with enough tap water to make a total volume of 350 mls. The resulting solution was stirred for 20 minutes on a multi-mixer, aged for 16 hours at 350° F., and then tested according to American Petroleum Institute (API) procedure RP-13 B. Test results are shown in Table III.

TABLE III

| Tetrapolymers Added to Saturated NaCl Water Mud (After Aging 16 Hours at 350° F.) | | | | | | | |
|---|---|---|---|---|---|---|---|
| Polymer | ppb | Type | PV | YP | Gels | RTWL | HTHPWL |
| Base Mud | — | — | | | | | |
| 237-26-1 | 11 | 35% gel log | 52 | 15 | 4/6 | 2.0 | 12.0 |
| 227-69-4 | 3.85 | dry | 43 | 1 | 8/14 | 4.8 | 26.0 |
| Hostadrill ™ | 5.0 | dry | 45 | 0 | 1/3 | 6.0 | 48.0 |

Saturated NaCl water mud = 215 ml tap water, 3 g bentonite, 76 g NaCl, 10 g causticized lignite, 0.8 g NaOH, and 350 g barite.
Hostadrill ™ is a commercially available drilling fluid additive from Hoescht.
ppb represents pounds per barrel
PV represents plastic viscosity in centipoise
YP represents yield point in lb/100 ft$^2$
Gels represents gel strength in lb/100 ft$^2$, 10 sec. and 10 min.
RTWL represents room temperature water loss at 100 psi in ml/30 minutes
HTHPWL represents water loss at 350° F., 500 psi in ml/30 minutes.

EXAMPLE IV

This example demonstrates the effectiveness of various polymers in the control of water loss in drilling fluid. The specific fluid used here was fresh water mud. Polymers were added as specified to fresh water mud, along with enough tap water to make a total volume of 350 mls. The resulting solution was stirred for 20 minutes on a Multi-Mixer, aged for 16 hours at 350° F., and then tested according to American Petroleum Institute (API) procedure RP-13 B. Test results are shown in Table IV.

TABLE IV

| | | Tetrapolymers Added to Fresh Water Mud | | | | | |
|---|---|---|---|---|---|---|---|
| Polymer | ppb | Type | PV | YP | Gels | RTWL | HTHPWL |
| Base Mud | — | — | 7 | 4 | 1/3 | 18.0 | — |
| 237-26-1 | 2.3 | 35% gel log | 17 | 16 | 4/5 | 8.0 | — |

Fresh Water Mud = 350 g tap water and 10 g bentonite
ppb represents pounds per barrel
PV represents plastic viscosity in centipoise
YP represents yield point in lb/100 ft$^2$
Gels represents gel strength in lb/100 ft$^2$, 10 sec. and 10 min.
RTWL represents room temperature water loss at 100 psi in ml/30 minutes
HTHPWL represents water loss at 350° F., 500 psi in ml/30 minutes.

That which is claimed is:

1. A water-based drilling fluid comprising
   a) a clayey mineral and water in amounts effective to form a water-based drilling fluid; and
   b) a tetrapolymer provided in an amount effective to provide water-loss control
   wherein the tetrapolymer is the product of a polymerization of the following four monomer components:
   (i) 2-acrylamido-2-methylpropane sulfonic acid and alkali salts thereof present in an amount in the range of from about 15 weight percent to about 45 weight percent;
   (ii) N-vinyl-2-pyrrolidone present in an amount in the range of from about 10 weight percent to about 30 weight percent;
   (iii) acrylamide present in an amount in the range of from about 20 weight percent to about 45 weight percent; and
   (iv) acrylic acid and alkali salts thereof present in an amount in the range of from about 10 to about 20 weight percent.

2. The water-based drilling fluid of claim 1 wherein the tetrapolymer is present in the range of from about 0.25 to about 8 lb/bbl of drilling fluid.

3. The water-based drilling fluid of claim 1 wherein the tetrapolymer is present in the range of from about 0.5 to about 5.0 lb/bbl of drilling fluid.

4. A method for drilling a well utilizing a rotary drill comprising circulating through said well a water-based drilling fluid containing an effective amount of a clayey material to form a water-based drilling fluid and an effective amount of tetrapolymer to control water-loss wherein the tetrapolymer is the product of a polymerization of the following four monomer components:
   (i) 2-acrylamido-2-methylpropane sulfonic acid and alkali salts thereof present in an amount in the range of from about 15 weight percent to about 45 weight percent;
   (ii) N-vinyl-2-pyrrolidone present in an amount in the range of from about 10 weight percent to about 30 weight percent;
   (iii) acrylamide present in an amount in the range of from about 20 weight percent to about 45 weight percent;
   (iv) acrylic acid and alkali salts thereof present in an amount in the range of from about 10 to about 20 weight percent; and
   said water-based drilling fluid will form a filter cake on the wall of said well.

* * * * *